United States Patent Office 3,276,514
Patented Oct. 4, 1966

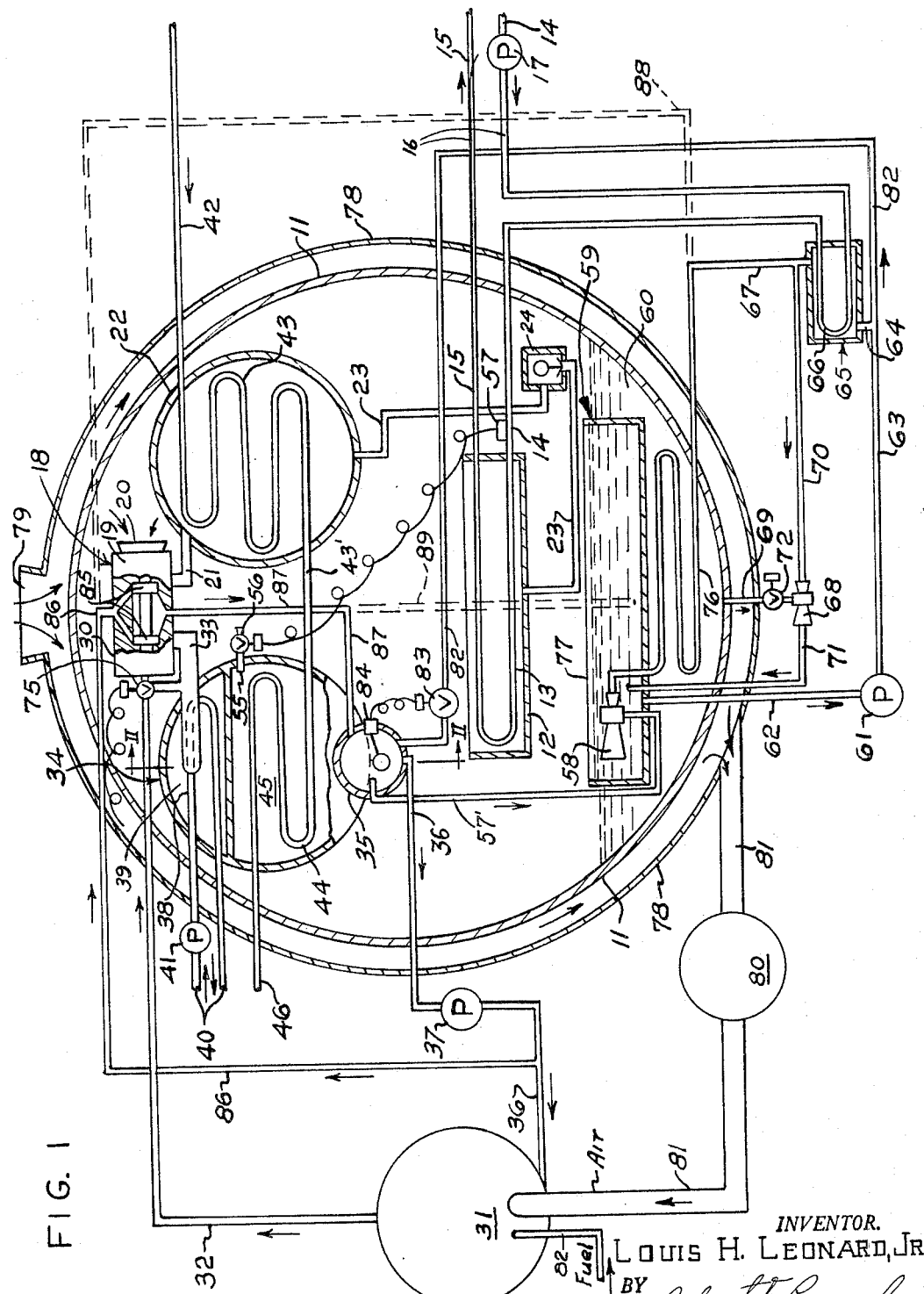

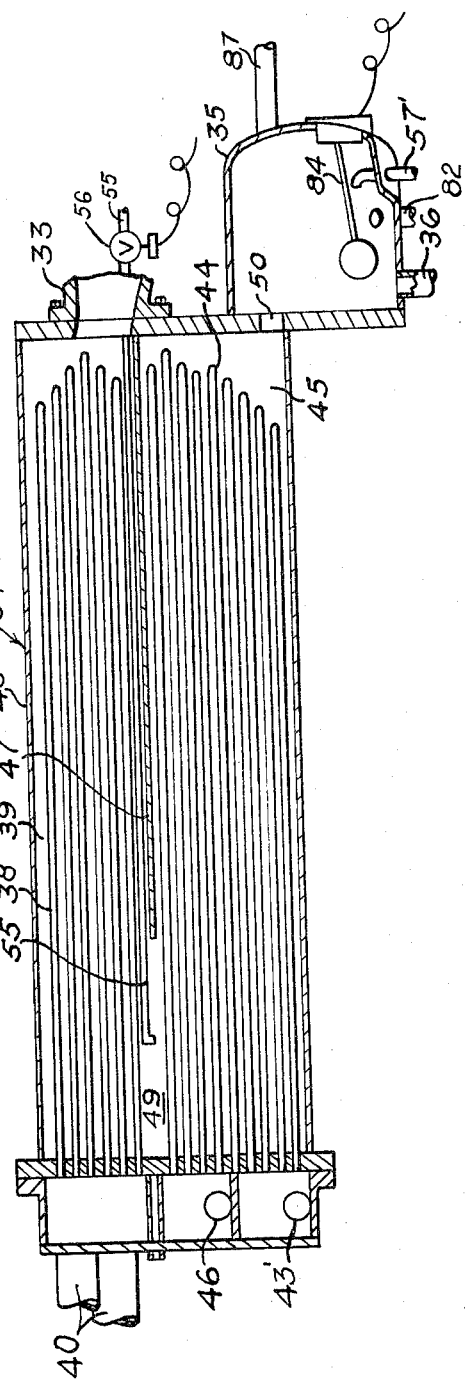

3,276,514
HEATING AND COOLING APPARATUS
Louis H. Leonard, Jr., De Witt, N.Y., assignor to Carrier Corporation, Syracuse, N.Y., a corporation of Delaware
Filed Sept. 1, 1964, Ser. No. 393,596
20 Claims. (Cl. 165—2)

This invention relates to a heating and cooling apparatus and to a method of providing heating and cooling and, more particularly, to such an apparatus and a method utilizing fluids which are mixed and then separated during heating and cooling operation.

A recently developed heating and cooling apparatus utilizes a steam driven turbocompressor for circulating refrigerant to provide cooling, and utilizes the steam to provide heating from a steam condenser simultaneously with or independently of cooling. Capacity control of the system is effected by blanketing a condensing portion of a steam condenser with refrigerant vapor to vary the discharge pressure of the turbine and therefore the refrigerant output of the turbocompressor and also to vary the temperature of the steam entering the steam condenser from the turbine, thus regulating the heating and cooling capacities of the system. The refrigerant and water mixed in the steam condenser and other portions of the system are separated and returned for reuse in the system. During winter heating operation, when cooling is not required so that the refrigerant side of the system may be inoperative, traces of refrigerant which may migrate into the steam condenser as from the inoperative turbocompressor, should be removed to avoid blanketing the heating portion of the steam condenser and thus reduce heat transfer from the steam to the heating medium circulated to the load to be heated. Since the refrigerant side of the system is inoperative, heat from the steam condenser is effective to raise substantially the refrigerant pressure in the system so that it is more difficult to remove refrigerant vapor from the steam condenser.

It is a primary object of this invention to provide a new and improved heating and cooling apparatus and a method of providing heating and cooling.

Another object is to provide a new and improved method of providing heating and cooling and a heating and cooling apparatus wherein a shell houses various components of the system and the system refrigerant charge boils out of the refrigerant side of the system and is condensed by and stored within the shell which is relatively cool during winter heating operation when cooling is not required.

Still another object is to provide a new and improved heating and cooling apparatus including a shell for condensing refrigerant vapor and holding a liquid body of refrigerant during winter heating operation when cooling is not required, and within the shell a chilled water tube bundle flooded with boiling refrigerant in a pan during cooling operation, a water tank for passing overflow water to the liquid body and at an elevation for the flow of excessive water floating on the liquid body of refrigerant into the tank during winter heating operation, the tank being below the pan for receiving water floating on the boiling refrigerant in the pan during cooling operation, a steam driven compressor and a refrigerant condenser in circuit for passing liquid refrigerant to the refrigerant pan, and a steam condenser in circuit for receiving and condensing the discharged steam and providing heated water to a load to be heated, the capacity of the system being regulated by passing refrigerant into the steam condenser to blanket a condensing portion of the steam condenser and a purge system for passing the refrigerant vapor from the steam condenser to the water tank. A related object is provision in such a purge system of a jet pump for withdrawing refrigerant vapor from the steam condenser and a water pump for passing impeller water from the water tank to the jet pump.

Another related object is provision for cooling the impeller water employed in the jet pump with returning chilled water during cooling operation and for cooling the impeller water with the liquid body of refrigerant during winter heating operation to maintain a water tank temperature sufficient for boiling refrigerant out of the impeller water and effectively preventing flashing of refrigerant in the jet pump. Still another related object is provision for effectively preventing the entry of ambient air into the system. Another related object is provision for balancing fluids on refrigerant and power sides of the system to maintain adequate fluid throughout the system. Another related object is provision of a steam generator for providing the steam, a jacket spaced about the shell, and provision for passing generator burner air through the jacket to cool the shell and preheat the air to the burner. Still another related object is provision for passing overflow water from the lower portion of the shell to the water tank during cooling operation. Still another related object is provision for lubricating turbocompressor bearings with water within the system.

These and other objects of the invention will be apparent from the following description and the accompanying drawings, in which:

FIGURE 1 is a flow diagram with portions broken away to more clearly illustrate a heating and cooling apparatus embodying the invention; and FIGURE 2 is a schematic, longitudinal sectional elevational view of a steam condenser portion of the system taken generally along the line II—II in FIGURE 1.

The invention will be described with reference to a preferred power fluid, which is water, ad a preferred refrigerant which is octafluorocyclobutane, commonly referred to as C318 and having a chemical formula $C_4F_8$. These fluids are particularly preferred because of their relative immiscibility and because they are inherently highly stable and do not tend to decompose or chemically react with each other or other materials in the system or to cause or promote corrosion and undesirable byproducts. Also, the refrigerant is heavier than water and a relatively noncondensible vapor at the temperatures and pressures at which steam condenses as well as the usual ambient atmospheric conditions of temperature and pressure. However, other power fluids and refrigerants having the desired chemical and physical properties may be utilized within the scope of this invention.

A more complete description of certain details and components of the system may be obtained from my copending United States patent application Serial No. 377,258, filed June 23, 1964, for a "Heating and Cooling System."

Referring to FIGURE 1 of the drawings, a large preferably uninsulated sealed shell 11 encloses major components of the system including, on a refrigerant side of the system, an evaporator portion or cooling means in the form of a refrigerant pan 12 containing a chilled water bundle 13 flooded in boiling refrigerant within the pan during cooling operation. The bundle 13 communicates with a returning branch 14 and a leaving branch 15 of a chilled water line 16 including a chilled water pump 17 for circulating chilled water to a load having a cooling requirement. A turbocompressor 18 within the shell 11 includes a compressor section 19 having an inlet 20 for receiving refrigerant vapor from the pan 12. From the compressor 19, high pressure refrigerant vapor passes through a line 21 to a refrigerant condenser 22 within the shell 11, from which refrigerant condensate flows through a condensate line 23 including a pressure seal and refrigerant flow metering means such as a float valve unit 24, and into the refrigerant pan 12 for cooling the chilled water, and from which the refrigerant returns as a vapor to the turbocompressor 18, thus completing a basic refrigeration cycle.

The power side of the system includes a turbine section 30 of the turbocompressor 18. A steam generator 31 provides preferably constant pressure steam through a steam supply line 32 to the turbine 30 for driving the compressor 19. Discharge steam passes from the turbine 30 through a steam discharge line 33 into a steam condenser 34 from which the steam condensate passes into a condensate chamber 35 of the steam condenser and then through a steam condensate line 36 including a steam condensate pump 37 for returning the condensate to the steam generator 31. A heater for heating a load includes a heating bundle 38 in an upper portion 39 of the steam condenser 34 (see also FIGURE 2). The bundle 38 is in the path of the entering discharge steam from the steam discharge line 33 for condensing the steam and providing heated water circulated through a heating line 40 by a pump 41 to the load having a heating requirement.

Tower water for condensing the refrigerant and steam enters the apparatus through an entering tower water line 42 and is first circulated through a refrigerant condensing bundle 43 in the refrigerant condenser 22 and then through a line 43' to a steam condensing bundle 44 in a lower portion 45 of the steam condenser, from which the tower water is returned to the tower through a leaving tower water line 46.

Referring particularly to FIGURE 2, the steam discharge line 33 opens into the upper portion 39 of the steam condenser 34 above a baffle 47 in sealed engagement with an outer shell 48 of the condenser 34 from the inlet of the steam discharge line 33 at one end of the condenser to an area of limited communication 49 at an opposite end of the condenser, so that the steam first sweeps across the heating bundle 38 for effectively preventing noncondensibles from blanketing the bundle. The steam then passes through the area 49 into the lower portion 45 of the steam condenser below the baffle 47 and across the bundle 44. The resultant steam condensate flows through a port 50 in a bottom portion of the steam condenser shell 48 and into the steam condensate chamber 35 from which the condensate is returned to the steam generator 31 through the condensate return line 36.

The cooling capacity and the simultaneous heating and cooling capacity is controlled by controlled blanketing of the steam condenser condensing coil 44 with a noncondensible vapor, herein refrigerant vapor introduced through a refrigerant inlet line 55 from within the large shell 11 into the lower portion 45 of the steam condenser at the area of limited communication 49 (see FIGURE 2). The rate of flow of refrigerant through the refrigerant inlet line 55 is regulated by a modulating refrigerant flow metering valve 56 controlled by a sensor 57 on the chilled water line 16 and responsive to chilled water temperature. Thus, as the chilled water temperature increases, indicating an increased cooling requirement, the valve 56 is closed somewhat to reduce the flow of refrigerant from within the large shell 11 into the steam condenser 34, thus reducing the blanketing of the condensing bundle 44 to reduce the turbine discharge pressure and thereby increase the turbocompressor refrigerant output and therefore the cooling capacity of the apparatus. Refrigerant vapor within the steam condenser 34 is effectively prevented from blanketing the heating coil and is preferably withdrawn at a constant rate from the steam condenser by purge means including a purge line 57' from the condensate chamber 35 to the throat of a first jet pump 58 in a water tank 59 within a lower portion 60 of the large shell. The purge line 57' passes hot vapors from the steam condenser 34 into the water tank 59 to heat the water therein. The water tank 59 is at the same pressure as saturated refrigerant within the large shell 11, that is, the suction pressure at the inlet 20 of the compressor 19. By maintaining the temperature of water in the tank 59 above the refrigerant vapor saturation temperature, refrigerant boils out of the water in the tank.

Impeller water for operating the jet pump 58 is provided by a water supply pump 61 having its inlet connected with the water tank 59 by means of a water line 62 and its outlet connected with a water supply line 63 having one branch 64 opening into a heat exchanger 65 for cooling the water by means of a cooling coil 66 suitably connected in the returning chilled water line 14. From the heat exchanger 65 the water passes through a first impeller water line 67 to the jet pump 58 within the water tank 59. Thus, during cooling operation, the water temperature in the tank 59 is maintained above the saturated refrigerant vapor temperature within the large shell 11.

During cooling operation, water vapor within the large shell 11 may condense and settle onto the upper surface of the boiling refrigerant within the refrigerant pan 12. Water may pass into the lower portion 60 of the large shell below the water tank 59, or some water may also pass with the liquid refrigerant through the refrigerant inlet line 23 into the pan 12 and float atop the boiling refrigerant within the pan. Water in the refrigerant pan 12 may overflow from the pan into the water tank 59 which is positioned below the refrigerant pan and extends outwardly from the pan, thus providing means for passing water from the refrigerant pan to the water tank. Any water collecting in the lower portion 60 of the large shell 11 is removed by a second jet pump 68 having its throat connected by a line 69 with the bottom of the large shell 11 and receiving impeller water through a second impeller water line 70 from the impeller water cooling heat exchanger 65. This impeller water, and any water removed from the lower portion of the shell, passes through a return line 71 from the jet pump 68 into the water tank 59. During winter heating operation, when the refrigerant side of the system is inoperative, a suitable valve 72 in the line 69 is closed so that the jet pump 68 is inoperative for returning liquid from the lower portion 60 of the large shell 11 to the water tank 59, for reasons which will be apparent later.

During winter heating operation, a three-way steam valve 75 in the steam supply line 32 is adjusted to divert steam from the turbine 30 thus rendering the turbocompressor and the refrigerant side of the system inoperative, and to pass the steam from the steam generator 31 directly into the steam discharge line 33 and therefore the steam condenser 34. In order to provide optimum heat transfer between the steam and the heating water circulated through the heating bundle 38 in the upper portion 39 of the steam condenser 34, the purge system is maintained in operation. The temperature and therefore the pressure of the refrigerant within the large shell 11 is substantially higher than during cooling operation and the refrigerant charge boils out of the refrigerant side of the system and condenses on the inner surface of the large shell 11 which is cooled by ambient air. The condensate collects in the lower portion 60 of the shell 11, thus reducing the load on the purge system by reducing the quantity of refrigerant vapor which must be handled by the purge system. Refrigerant in the lower portion 60 of the shell 11 vaporizes, thus cooling the body of liquid refrigerant, and the vapor is condensed on the inner surface of the larger shell and flows back to the lower portion of the shell. The liquid refrigerant in the lower portion 60 of the shell 11 is also cooled by the cool shell.

Refrigerant free impeller water for the jet pump 58 is highly desirable during winter heating operation since the jet pump 58 must operate at higher pressure ratio conditions than during cooling operation. In order to cool the impeller water during winter heating operation, a cooling coil portion 76 of the first impeller water supply line 67 to the jet pump 58 is submerged in the liquid refrigerant in the lower portion of the shell so that the 6. The combination of claim 3 wherein said balancing means includes said purge means for passing water from said steam condenser to said water tank, and said water pump is connected in circuit for passing water from said water tank to said steam condenser.

7. The combination of claim 1, and means including a steam generator for passing steam to said turbocompressor to drive the turbocompressor, said generator including a burner, a jacket spaced about said shell, and means for passing burner air through said jacket to cool said shell for condensing refrigerant vapor within said shell and preheating the air, and for passing the preheated air to said burner.

8. The combination of claim 1, and means operative during cooling operation for passing water from said lower portion of said shell to said water tank.

9. The combination of claim 8 wherein the last said means includes another jet pump in circuit for receiving impeller water from said water pump.

10. The combination of claim 1 wherein said turbocompressor includes water lubricated bearings.

11. The combination of claim 10 including, means for passing steam condensate to said turbocompressor to lubricate said bearings, and means for returning the lubricating condensate to said steam condenser.

12. The combination of claim 10 including, means for passing water from said water tank to said turbocompressor to lubricate said bearings, and means for returning the lubricating water to said water tank.

13. The combination of claim 1 wherein said shell is sealed and said condensers and turbocompressor are within said shell, means for selectively passing water between said steam condenser and said water tank to maintain adequate water throughout the system and including, said purge means for passing water from said steam condenser to said water tank, and said water pump connected in circuit for passing water from said water tank to said steam condenser, means including a steam generator for passing steam to said turbocompressor to drive the turbocompressor, said generator including a burner, a jacket spaced about said shell, and means for passing burner air through said jacket to cool said shell for condensing refrigerant vapor within said shell and preheating the air, and for passing the preheated air to said burner, means operative during cooling operation for passing water from said lower portion of said shell to said water tank and including another jet pump in circuit for receiving impeller water from said water pump, said turbocompressor having water lubricated bearings, and means for circulating water in the system to lubricate said bearings.

14. A heating and cooling apparatus comprising, a shell for condensing refrigerant vapor during winter heating operation when cooling is not required, the refrigerant being immiscible with water, said shell having a lower portion for holding liquid and receiving the condensed refrigerant during winter heating operation; means for cooling a load including a compressor, a condenser, and an evaporator in communication with one another in said shell, said evaporator comprising a pan within said shell and a chilled water tube bundle within said pan to be flooded with boiling refrigerant in the pan during cooling operation; refrigerant in the pan boiling by heat exchange relation with water passing through the tube bundle, refrigerant collecting in the lower portion of the shell during winter heating operation, and a water tank within said shell and positioned for passing overflow water from the tank to said lower portion and for the passage of excessive water floating on the liquid refrigerant in said lower portion into the tank during winter heating operation, and said tank being below the pan for gravity flow of any water collected on top of the refrigerant in said pan into the tank during cooling operation.

15. The apparatus of claim 14, and a steam driven compressor and a refrigerant condenser in circuit for passing liquid refrigerant to said refrigerant pan, and a steam condenser in circuit for receiving and condensing the discharged steam and providing heated water to a load to be heated; and means for regulating the capacity of the system and including, means for passing refrigerant into said steam condenser and purge means for withdrawing refrigerant vapor from said steam condenser and passing the vapor to said water tank.

16. The apparatus of claim 15, and a power side including said steam condenser, and means for passing water between said power side and said water tank to maintain adequate water throughout the system.

17. A heating and cooling apparatus utilizing water power fluid and a refrigerant immiscible with, heavier than and having a lower boiling point than water, comprising an uninsulated sealed shell adapted to be surrounded by ambient air to condense refrigerant vapor therein during winter heating operation of the system when cooling is not required, said shell having a lower portion for holding liquid and receiving the condensed refrigerant during winter heating operation; means for providing chilled water to a load to be cooled and including a refrigerant pan within said shell and a chilled water tube bundle within said pan to be flooded by boiling refrigerant within the pan during cooling operation of the system; means including an open top water tank positioned within said shell for the passage of overflow water from said tank to said lower portion and for the passage of excessive water floating on the liquid refrigerant in said lower portion into said tank during winter heating operation, said tank extending outwardly of and being below said pan for collecting overflow of any water collected on top of the refrigerant in said pan; means including a steam driven turbocompressor within said shell and having water lubricated bearings and a refrigerant vapor inlet for receiving refrigerant vapor within said shell, a refrigerant condenser within said shell and in circuit between said turbocompressor and said refrigerant pan for receiving compressed refrigerant vapor from said turbocompressor and passing liquid refrigerant to said pan to cool the chilled water, and means including a steam condenser within said shell and in circuit for receiving discharge steam from said turbocompressor, said steam condenser having a first bundle for condensing steam and a heated water bundle for condensing steam and providing heated water for a load to be heated; means for passing lubricating water to said bearings and including a water pump for receiving water from said water tank; means for regulating the cooling and simultaneous heating and cooling capacities of the system by blanketing said first bundle with refrigerant vapor and including, means for passing refrigerant into said steam condenser and purge means for withdrawing refrigerant vapor and water vapor carried therewith from said steam condenser, said purge means including, a jet pump positioned to discharge into said water tank and having a throat portion connected with said steam condenser for withdrawing said refrigerant vapor from the steam condenser, and said water pump being in circuit for passing water from said water tank to said jet pump to provide impeller water for the jet pump; and heat exchange means for cooling the water from said water pump and including, a heat exchanger in circuit for cooling the lubricant and impeller water with chilled water returning to said chilled water bundle during cooling operation of the system, and another heat exchanger in circuit for cooling the impeller water with the liquid refrigerant in said lower portion during winter heating operation of the system, whereby the water temperature in said tank is above the saturated refrigerant temperature in said shell to boil refrigerant out of the lubricant, makeup and impeller water, and whereby leakage of ambient air into the system, and escape of refrigerant from the system, is effectively prevented.

18. The apparatus of claim 17, and means for passing water between said steam condenser and said water tank to maintain adequate water throughout the system and impeller water is always above the refrigerant vapor saturation temperature in the shell 11. Since it is desired that the liquid refrigerant be held in the lower portion of the shell 11 during winter heating, the previously mentioned valve 72 in the line to the second jet pump 68 is closed.

During winter heating operation, water may overflow from the water tank 59 into the lower portion 60 of the large shell 11 and thus float atop the liquid refrigerant within the lower portion of the shell. In order to return excessive overflow water to the water tank 59, the upper edge 77 of the water tank is at an elevation very slightly above the top level of the liquid refrigerant so that only a small quantity of the water within the system is retained on the surface of the liquid refrigerant, the remainder being free to flow into the water tank when the level in the tank drops.

If desired, a jacket 78 may be spaced about the large shell 11 and provided with an air inlet 79 for circulating air about the outer surface of the large shell to cool the shell and assure adequate condensing of refrigerant on the inner surface of the shell. From the jacket 78, the air may be passed by a blower 80 through a burner air supply line 81 to a burner (not shown) of the steam generator 31, so that the burner air is preheated. A fuel line 82 supplies suitable fuel, such as gas or oil, to the burner for mixing with the air.

Means is provided for balancing the water on the power side of the system and in the water tank 59 and, as illustrated, includes the purge line 57' which opens into the steam condensate chamber 35 at a suitable level for returning excess condensate from the steam condenser 34 to the water tank 59. The water supply line 63 from the outlet of the water supply pump 61 has a second, make-up water branch 82 which opens into the steam condensate chamber 35 for passing boiler make-up water to the steam condenser 34. Flow of water through the make-up water line 82 is controlled by a shut-off valve 83 opened responsive to a predetermined low water level as sensed by a float actuated sensor 84 in the steam condensate chamber 35.

The turbocompressor 18 is preferably provided with water lubricated bearings, as 85, and water for lubricating the bearings may be provided through a lubricant water line 86 branching off the steam condensate line between the steam condensate pump and the steam generator. A drain line 87 from the turbocompressor 18 opens into the steam condensate chamber 35 for passing the lubricant water from the bearings 85 and any leakage of steam or refrigerant within the turbocompressor, to the steam condensate chamber. Alternatively, water from the water supply tank 59 may be provided for lubricating the turbocompressor bearings 85 and herein a lubricant water branch line 88, shown in phantom lines, branches off from the first jet impeller water line 67 in lieu of the previously mentioned lubricant water line 86, for supplying the lubricating water. It may then be desired to return the drainage from the turbocompressor 18 directly to the water tank 59 as by drain line 89, shown in phantom lines, opening into the water tank in lieu of the portion of the drain line 87 to the steam condensate chamber 35.

Thus, the apparatus provides a simple hermetic system which effectively prevents the entry of ambient air into the apparatus since during normal cooling operation the refrigerant vapor in the shell 11 is about 5 p.s.i.g., and during winter heating operation it is substantially higher. Substantially refrigerant free water is provided in the water tank 59 since this water is at a higher temperature than the saturation temperature of the refrigerant within the large shell 11 so that any refrigerant in the water within the water tank boils out of the water for return to the refrigerant side of the system. Thus, substantially refrigerant free lubricant, jet and boiler make-up water is provided. Refrigerant free water is desirable because it prolongs turbocompressor bearing life, permits better heat exchange in the steam generator and, perhaps most important, it allows for continuous, unbroken operation of the first jet pump 58 which assures proper output of the turbocompressor 18 without abnormal speed variation. The first jet pump 58 continuously removes traces of refrigerant vapor from the steam condenser and particularly the heating bundle, thus providing optimum heating to the load to be heated.

While a preferred embodiment of the invention has been described and illustrated, it will be understood that the invention is not limited thereto since it may be otherwise embodied within the scope of the following claims.

I claim:

1. In a heating and cooling apparatus utilizing water and a refrigerant immiscible with, heavier than and having a lower boiling point than water, the combination of means including a shell for condensing refrigerant vapor therein during winter heating operation when cooling is not required, said shell having a lower portion for holding a liquid and receiving the condensed refrigerant during winter heating operation; means for providing chilled water to a load to be cooled and including a pan within said shell and a tube bundle within said pan to be flooded with boiling refrigerant within the pan during cooling operation; means including a water tank positioned within said shell for the passage of overflow water from the tank to said lower portion and for the passage of excessive water floating on the liquid refrigerant in said lower portion into the tank during winter heating operation, said pan and tank being associated in combination for the passage of any water collected on top of the refrigerant in said pan into said water tank during cooling operation; means including a steam driven turbocompressor and a refrigerant condenser in circuit for passing liquid refrigerant to said refrigerant pan, and a steam condenser in circuit for receiving discharge steam from said turbocompressor, said steam condenser having means for condensing steam and providing heated water for a load to be heated; and means for regulating the cooling and simultaneous heating and cooling capacities of the system and including, means for passing refrigerant into said steam condenser and purge means for withdrawing refrigerant vapor from said steam condenser, said purge means including, a jet pump in circuit to discharge into said water tank and connected with said steam condenser for withdrawing refrigerant vapor from the steam condenser, a water pump for passing impeller water from said water tank to said jet pump, and heat exchange means for cooling said impeller water and including, means for cooling said impeller water with the chilled water returning to said chilled water bundle during cooling operation, and means for cooling said impeller water with the liquid refrigerant in said lower portion of said shell during winter heating operation, whereby the water temperature in said tank is above the saturated refrigerant vapor temperature in said shell for boiling refrigerant out of the water in the tank and effectively preventing flashing in said jet pump.

2. The combination of claim 1 wherein said shell is sealed and said condensers and turbocomressor are within said shell, thereby effectively preventing the entry of ambient air into the system and loss of refrigerant from the system.

3. The combination of claim 1, and a power side including the turbine and steam condenser, and balancing means for selectively passing water between said power side and said water tank to maintain adequate water throughout the system.

4. The combination of claim 3 wherein said balancing means includes said water pump connected in circuit for passing water from said water tank to said power side.

5. The combination of claim 3 wherein said balancing means includes said purge means for passing water from said power side to said water tank.

including, said purge means for passing water from said steam condenser to said water tank, and said water pump connected in circuit for passing water from said water tank to said steam condenser, and means operative during cooling operation for passing water from said lower portion of said shell to said water tank and including another jet pump in circuit for receiving impeller water from said water pump.

19. A heating and cooling apparatus comprising, means including a refrigerant side including a compressor, a condenser, and an evaporator portion for circulating a refrigerant fluid to provide cooling for a load during cooling operation of the system; means including a power side including power fluid means for actuating the compressor and a fluid condenser portion for circulating a hot power fluid to provide heating for a load during heating operation of the system and for operating the refrigerant side during cooling operation; a sealed shell enveloping the evaporator and steam condenser portions and in communication with said refrigerant side for the passage of refrigerant vapor from said refrigerant side into said shell and for retaining a liquid body of refrigerant during winter heating operation of the system when cooling is not required; and means for cooling said shell during winter heating operation and condensing refrigerant vapor on the shell for collection of the condensate in said liquid body, and for cooling the body of liquid.

20. In a method of operating a heating and cooling system having a shell, a refrigerant side for circulating refrigerant within the shell to provide cooling, and a power side for operating the refrigerant side and for providing heat within the shell to heat a heating load, the shell being in communication with refrigerant on the refrigerant side, the steps of operating the power side to provide heating for a load and to actuate the refrigerant side to provide cooling for a second load, discontinuing operation of the refrigerant side thereby discontinuing cooling of the second load, operating the power side to provide heating and a temperature within the shell above the boiling temperature of the refrigerant to vaporize the refrigerant in the shell, cooling the shell to condense the refrigerant, and collecting the condensed refrigerant in a body of liquid refrigerant in contact with the cool shell to retain the liquid body of refrigerant below its boiling point.

References Cited by the Examiner
UNITED STATES PATENTS

| | | | |
|---|---|---|---|
| 1,102,998 | 7/1914 | Coleman | 62—501 X |
| 1,981,952 | 11/1934 | Foss | 165—27 X |
| 2,637,981 | 5/1953 | Russell | 62—501 X |

ROBERT A. O'LEARY, *Primary Examiner.*

M. A. ANTONAKAS, *Assistant Examiner.*